(12) United States Patent
Conway

(10) Patent No.: US 6,986,210 B1
(45) Date of Patent: Jan. 17, 2006

(54) ADJUSTABLE CUTTING TEMPLATE

(76) Inventor: Dave P. Conway, 3938 Vera Cruz Ave. North, Robbinsdale, MN (US) 55422

( * ) Notice: Subject to any disclaimer, the term of this patent is extended or adjusted under 35 U.S.C. 154(b) by 0 days.

(21) Appl. No.: 10/779,138

(22) Filed: Feb. 17, 2004

(51) Int. Cl.
*G01B 3/14* (2006.01)

(52) U.S. Cl. .............................. 33/562; 33/452; 33/454; 33/464

(58) Field of Classification Search ................ 33/562, 33/194, 563, 452, 454, 464, 1 K, 1 BB
See application file for complete search history.

(56) References Cited

U.S. PATENT DOCUMENTS

| | | | |
|---|---|---|---|
| 1,646,868 A | 10/1927 | Newlands et al. | |
| 2,652,866 A | 9/1953 | Drain | |
| 2,867,911 A * | 1/1959 | Atkinson | 33/194 |
| 3,540,130 A | 11/1970 | French | |
| 4,177,569 A | 12/1979 | Greer | |
| 4,696,113 A * | 9/1987 | Rice | 33/562 |
| 4,831,739 A * | 5/1989 | Davidson | 33/427 |
| 5,390,422 A | 2/1995 | Hill | |
| 6,293,322 B1 | 9/2001 | Wilson-South | |
| 6,553,683 B1 * | 4/2003 | Klass et al. | 33/562 |
| 6,810,598 B2 * | 11/2004 | Boys | 33/528 |
| 2002/0023363 A1 | 2/2002 | Woerlein et al. | |

* cited by examiner

*Primary Examiner*—Christopher W. Fulton
*Assistant Examiner*—Tania Courson

(57) ABSTRACT

An adjustable cutting template includes a plurality of leg members selectively engageable with each other for defining a cutting perimeter on a substantially solid surface. Each plurality of leg members includes a first portion and a second portion attached thereto and a plurality of holes formed therein and spaced along a length thereof. Select ones of the first and second portions define a plurality of male and female portions, respectively. The plurality of female portions include a plurality of lip portions integral therewith for receiving the plurality of male portions thereon so that same can be slidably positioned within the plurality of female portions. The template further includes a plurality of stop members attached to the plurality of leg members for defining a maximum distance that the plurality of leg members can be slidably engaged with each other.

11 Claims, 3 Drawing Sheets

ADJUSTABLE CUTTING TEMPLATE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to routing templates and, more particularly, to an adjustable cutting template for installing sink basins in countertops.

2. Prior Art

A sink may be thought of as a water basin fixed to a wall or floor, surrounded by a countertop as a level surface, and serviced by both a piped supply of water and a drainpipe. Sink basins mounted from the underneath side of a countertop may be installed in polymer countertops by one of two methods: (i) either by chemical fusion using an epoxy-type adhesive so that the sink basin becomes integral with the countertop; or (ii) mechanically securing the sink basin to the countertop using mechanical fasteners and sealant. Both of these methods of installation are normally performed in specialized fabrication shops through a highly skilled process.

The highly skilled installation process may involve the following steps: (1) penciling square reference lines at the desired sink basin location on the top surface of a countertop; (2) positioning the sink basin on the countertop and tracing the sink basin perimeter precisely over the reference lines; (3) removing the sink basin and cutting an opening in the countertop as defined by the tracing; (4) drawing new square reference lines; (5) positioning the sink basin carefully over the cut opening; (6) preparing and attaching a number of sink basin positioning blocks around the sink opening perimeter; (7) applying adhesive or sealant to the sink basin flange; (8) again setting the sink basin carefully in place; and (9) attaching mechanical fasteners such as clamps to secure the sink basin to the countertop.

The above process may take a half-hour longer for a skilled fabricator to install even a small sink basin. Solid polymer basins that are integrally mounted into a countertop made of a particle board substrate with a veneered polymer overlay may require the additional step of routing away the substrate material below the veneer surface to provide a polymer-to-polymer joint. This step is very precise and requires a fabricator of the highest skill level. This is one reason why the use of integrally mounted polymer sinks in veneered polymer counters is limited in the conventional art. In addition to these problems, there are many opportunities for error in every step of the current methodology of under mounting sink basins. Mitigating this potential for errors requires the employment of skilled, expensive journeypersons in these tasks.

In more advanced fabrication shops, plywood outline templates are often used to locate and trace the sink basin perimeter to be cut, eliminating the need to draw square reference lines. In some instances, plywood router templates are used in cutting the opening over which the sink basin is then mounted. Although the use of these templates reduces errors and process time somewhat, the overall task still requires a highly skilled worker and a good deal of time. For instance, although a router template to cut a sink opening may facilitate a smooth and properly shaped opening, the router template will not obviate the need for tracing the sink basin, for fabricating and attaching sink basin positioning blocks, and for removing the tracing lines. In addition, the plywood templates may generally only be used for one particular size sink basin.

One of the more time consuming elements of the current methodology involves the process of clamping integrally mounted basins to a countertop work piece. After having reached that stage in the overall process outlined above at which the sink basin is ready to be mounted, a plywood clamping template is positioned below the countertop by a worker such that the plywood overlaps the sink basin opening. The worker below then passes an adjustable clamping device through a prepared hole in the plywood template, then through the sink basin opening, and also through the sink basin drain hole, whereby the sink basin is clamped firmly to the countertop by a second worker positioned above the countertop.

This operation often requires two workers to both clamp and remove the plywood template. Also, this method of mounting sink basins requires a special topless workbench that permits access below to apply and remove the plywood template and clamping device. Since this workbench is not always the best work surface for other types of operations, additional time and material expense are required to change bench configurations for different shop functions.

Collectively, these conventional methods represent the fabrication industry's "best practice", as recommended by the various sink basin manufacturers, yet they do not meet the need for a fast, efficient, and error-free method to (i) accurately locate and cut a sink basin opening and (ii) to mount a sink basin into a countertop.

Accordingly, a need remains for an adjustable cutting template for installing sink basins and the like.

BRIEF SUMMARY OF THE INVENTION

In view of the foregoing background, it is therefore an object of the present invention to provide a device for accurately installing sink basins in countertops. These and other objects, features, and advantages of the invention are provided by an adjustable cutting template including a plurality of leg members being selectively engageable with each other for defining a cutting perimeter on a substantially solid surface. The plurality of leg members each include a first portion and a second portion attached thereto and extending substantially orthogonal therefrom respectively. Each of the plurality of leg portions has a plurality of holes formed therein and spaced along a length thereof. The first and second portions each has a centrally disposed longitudinal axis and opposed sidewalls equally spaced therefrom and extending substantially parallel thereto.

Select ones of the first and second portions define a plurality of male portions and select ones of the first and second portions define a plurality of female portions. The plurality of male portions are slidably engageable with the plurality of female portions and in a substantially parallel direction to the respective longitudinal axis thereof. The plurality of female portions include a plurality of lip portions integral therewith and extend inwardly towards the longitudinal axis thereof respectively and for receiving the plurality of male portions thereon so that same can be slidably positioned within the plurality of female portions.

The template further includes a plurality of fastening members selectively positionable within the plurality of holes and for maintaining the leg members at stable positions. The template further includes a plurality of stop members attached to the plurality of leg members. Select ones of the plurality of stop members are engageable with each other for defining a maximum distance that the plurality of leg members can be slidably engaged with each other.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
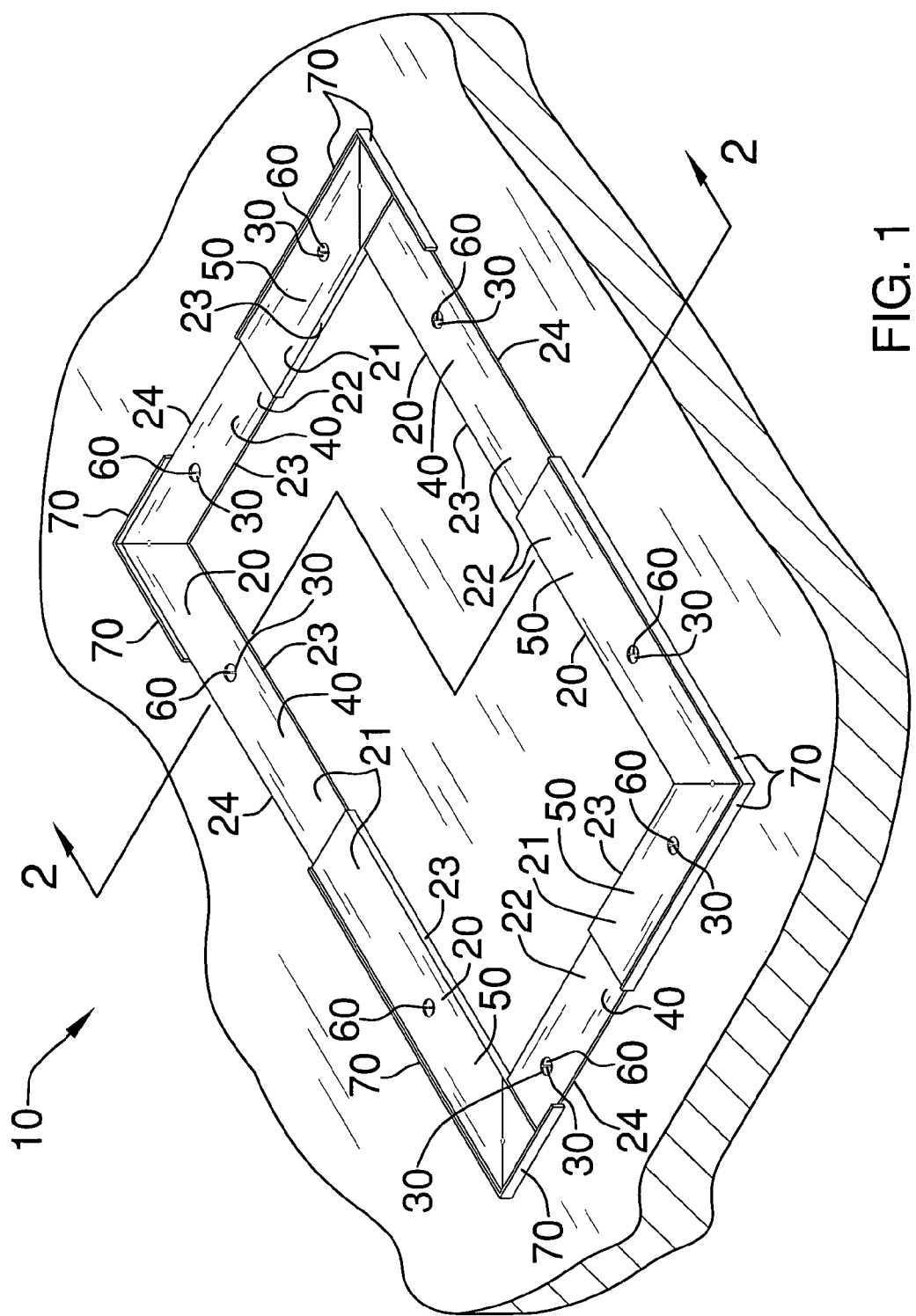
FIG. 1 is a perspective view showing an adjustable cutting template, in accordance with the present invention.
Figure 2:
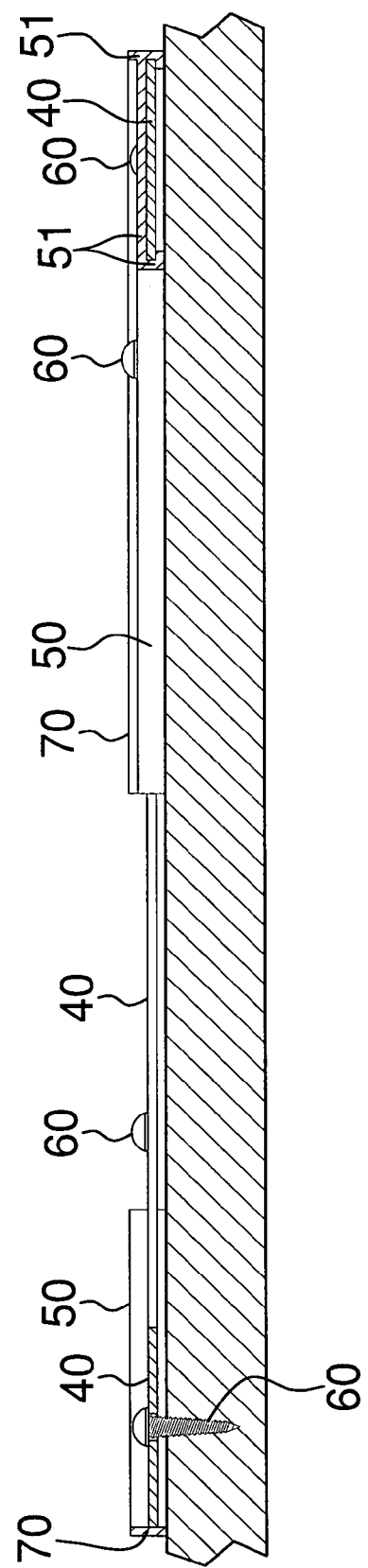
FIG. 2 is a cross-sectional view of FIG. 1, taken along line 2—2.
Figure 3:
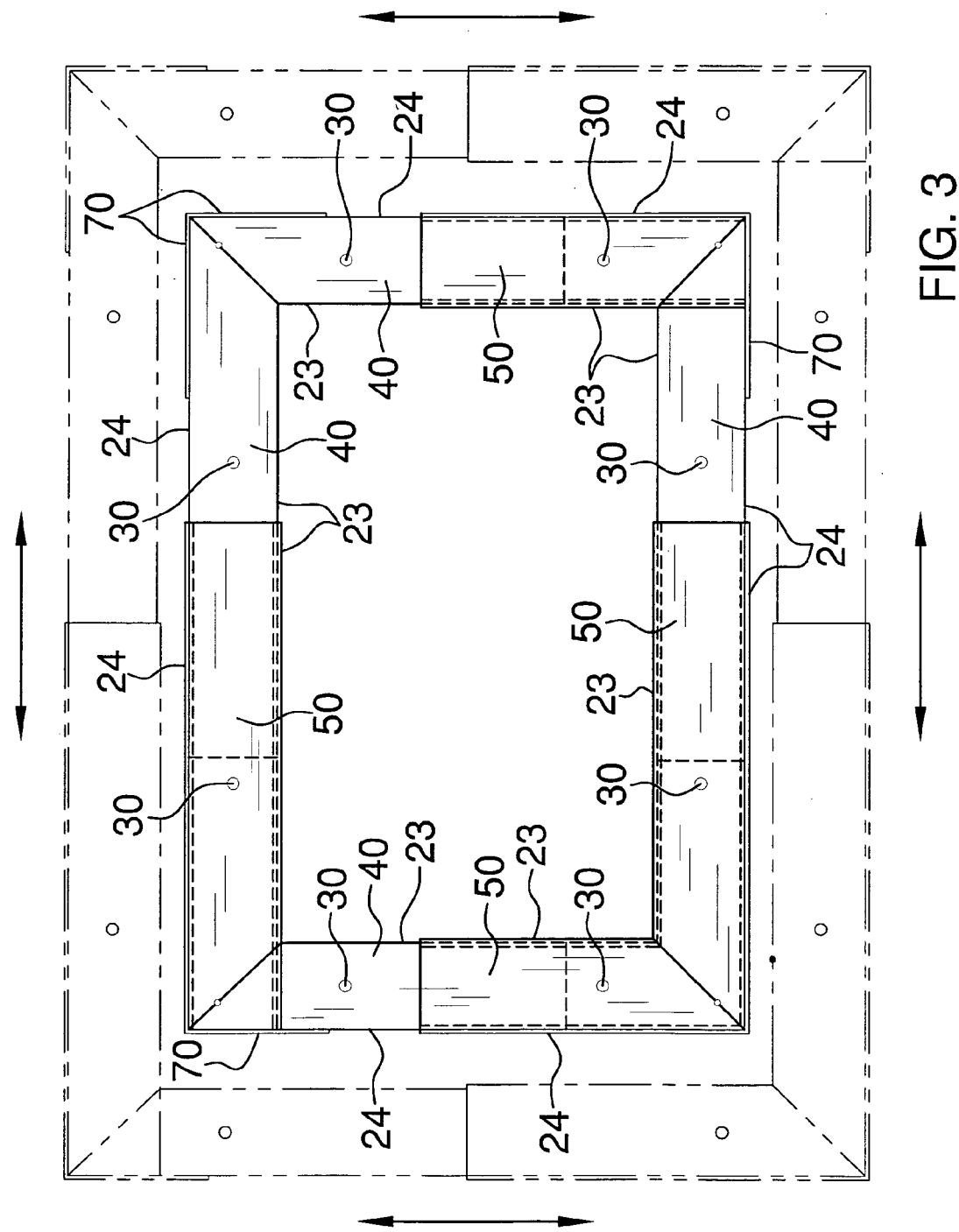
FIG. 3 is a top plan view showing the present invention at an expanded position.

The device of this invention is referred to generally in FIGS. 1–3 by the reference numeral 10 and is intended to provide an adjustable template for sink basin cutouts. It should be understood that the template 10 may be used to cut out many different types of openings, and should not be limited to only openings for sinks.

Referring to FIG. 1, the template 10 includes a plurality of leg members 20 selectively engageable with each other for defining a cutting perimeter on a substantially solid surface. The plurality of leg members 20 each include a first portion 21 and a second portion 22 attached thereto and extending substantially orthogonal therefrom respectively. Each of the plurality of leg portions 20 has a plurality of holes 30 formed therein and spaced along a length thereof. The first 21 and second 22 portions each has a centrally disposed longitudinal axis and opposed sidewalls 23, 24 equally spaced therefrom and extending substantially parallel thereto. The template 10 is preferably formed from plastic because of its lightweight and durability, but may be formed from wood or other lightweight metal.

Now referring to FIG. 3, select ones of the first 21 and second 22 portions define a plurality of male portions 40 and select ones of the first 21 and second 22 portions define a plurality of female portions 50. The plurality of male portions 40 are slidably engageable with the plurality of female portions 50 and in a substantially parallel direction to the respective longitudinal axis thereof. The plurality of female portions 50 include a plurality of lip portions 51 integral therewith and extending inwardly towards the longitudinal axis thereof respectively and for receiving the plurality of male portions 40 thereon so that same can be slidably positioned within the plurality of female portions, as perhaps best shown in FIG. 2. Advantageously, this enables the template 10 to be used for sinks of different styles and sizes.

Referring back to FIG. 1, the template 10 further includes a plurality of fastening members 60 selectively positionable within the plurality of holes 30 and for maintaining the leg members 20 at stable positions. It is important to maintain the template 10 at a stable position during operating conditions so that an operator may make an even cut. Instability may cause an operator to cut incorrectly, resulting in an uneven line or damage to the template 10. The template 10 further includes a plurality of stop members 70 attached to the plurality of leg members 20. Select ones of the plurality of stop members 70 are engageable with each other for defining a maximum distance that the plurality of leg members 20 can be slidably engaged with each other, thus preventing a user from forcibly engaging the leg members 20 to a point where damage to the leg members 20 may occur.

Contractors and do-it-yourselfers alike will find the template 10 greatly reduces the time and effort required to install sink basins in countertops. Instead of drawing an outline for the opening for a sink basin, a user simply turns the countertop upside down and lays the template 10 on the underside of the countertop. After temporarily screwing the template 10 in place, a standard jigsaw is used to cut the opening and a hole saw is used for the corners. The template 10 is lightweight, easy to use and cost efficient.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States:

1. A cutting template comprising:

a plurality of leg members being selectively engageable with each other for defining a cutting perimeter along an interior edge thereof, said plurality of leg members each including a first portion and a second portion attached thereto and extending substantially orthogonal therefrom respectively, said first and second portions each having a centrally disposed longitudinal axis and opposed sidewalls equally spaced therefrom and extending substantially parallel thereto, each said plurality of leg portions having a plurality of holes passing therethrough respectively and spaced along a length thereof such that selected ones of the holes can be vertically aligned during operating conditions;

a plurality of stop members directly engaged with said plurality of leg members and located on said first portion and said second portion of each leg member, select ones of said plurality of stop members being engageable with each other for defining a maximum distance said plurality of leg members are slidably engageable with each other, said plurality of stop members having rectilinear shapes and extending along an outer edge of said plurality of leg members respectively; and a plurality of fastening members selectively positionable through said plurality of holes and into a solid surface for maintaining said leg members at stable positions.

2. The template of claim 1, wherein select ones of said first and second portions define a plurality of male portions.

3. The template of claim 2, wherein select ones of said first and second portions define a plurality of female portions.

4. The template of claim 3, wherein said plurality of male portions are slidably engageable with said plurality of female portions and in a substantially parallel direction to the respective longitudinal axis thereof.

5. The template of claim 3, wherein said plurality of female portions comprise a plurality of lip portions integral therewith and extending inwardly towards the longitudinal axis thereof respectively and for receiving said plurality of male portions thereon so that same can be slidably positioned within said plurality of female portions.

6. The template of claim 1, wherein select ones of said first and second portions define a plurality of male portions and a plurality of female portions.

7. A cutting template comprising:

a plurality of leg members being selectively engageable with each other for defining a cutting perimeter along an interior edge thereof, said plurality of leg members each including a first portion and a second portion attached thereto and extending substantially orthogonal therefrom respectively, said first and second portions each having a centrally disposed longitudinal axis and opposed sidewalls equally spaced therefrom and extending substantially parallel thereto, each said plurality of leg portions having a plurality of holes passing therethrough respectively and spaced along a length thereof such that selected ones of the holes can be vertically aligned during operating conditions;

a plurality of stop members directly engaged with said plurality of leg members and located on said first portion and said second portion of each leg member, select ones of said plurality of stop members being engageable with each other for defining a maximum distance said plurality of leg members are slidably engageable with each other, said plurality of stop members having rectilinear shapes and extending along an outer edge of said plurality of lea members respectively, select ones of said first and second portions define a plurality of male portions and a plurality of female portions; and a plurality of fastening members selectively positionable through said plurality of holes and into a solid surface for maintaining said leg members at stable positions.

8. The template of claim 7, wherein said plurality of male portions are slidably engageable with said plurality of female portions and in a substantially parallel direction to the respective longitudinal axis thereof.

9. The template of claim 7, wherein said plurality of female portions comprise a plurality of lip portions integral therewith and extending inwardly towards the longitudinal axis thereof respectively and for receiving said plurality of male portions thereon so that same can be slidably positioned within said plurality of female portions.

10. A cutting template comprising:

a plurality of leg members being selectively engageable with each other for defining a cutting perimeter along an interior edge thereof, said plurality of leg members each including a first portion and a second portion attached thereto and extending substantially orthogonal therefrom respectively, each said plurality of leg portions having a plurality of holes passing therethrough respectively and spaced along a length thereof such that selected ones of the holes can be vertically aligned during operating conditions;

a plurality of stop members directly engaged with said plurality of leg members and located on said first portion and said second portion of each leg member, select ones of said plurality of stop members being engageable with each other for defining a maximum distance said plurality of lea members are slidably engageable with each other, said plurality of stop members having rectilinear shapes and extending along an outer edge of said plurality of leg members respectively, select ones of said first and second portions define a plurality of male portions and a plurality of female portions respectively wherein said plurality of male portions are slidably engageable with said plurality of female portions and in a substantially parallel direction to the respective longitudinal axis thereof; and a plurality of fastening members selectively positionable through said plurality of holes and into a solid surface for maintaining said leg members at stable positions.

11. The template of claim 10, wherein said plurality of female portions comprise a plurality of lip portions integral therewith and extending inwardly towards the longitudinal axis thereof respectively and for receiving said plurality of male portions thereon so that same can be slidably positioned within said plurality of female portions.

* * * * *